Figure 1:
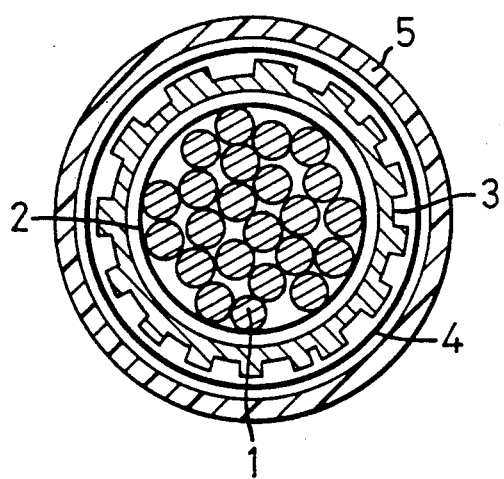

United States Patent [19]

Huybrechts

[11] Patent Number: 4,953,946
[45] Date of Patent: Sep. 4, 1990

[54] CABLES WITH LOW MS HEC WATER-BLOCKING MATERIAL

[75] Inventor: Serge Huybrechts, Doune, Great Britain

[73] Assignee: Union Carbide Chemicals and Plastics Company Inc., Danbury, Conn.

[21] Appl. No.: 272,700

[22] PCT Filed: Mar. 3, 1988

[86] PCT No.: PCT/EP88/00159

§ 371 Date: Feb. 13, 1988

§ 102(e) Date: Feb. 13, 1988

[87] PCT Pub. No.: WO88/06741

PCT Pub. Date: Sep. 7, 1988

[30] Foreign Application Priority Data

Mar. 7, 1987 [GB] United Kingdom ............... 8704938

[51] Int. Cl.$^5$ .................... G02B 6/44; H02G 15/20
[52] U.S. Cl. ................... 350/96.23; 174/23 C
[58] Field of Search .................. 350/96.23; 174/23 C

[56] References Cited

U.S. PATENT DOCUMENTS

| | | | |
|---|---|---|---|
| 4,084,060 | 4/1978 | Glass, Jr. et al. | 536/85 X |
| 4,308,416 | 12/1981 | Herman et al. | 174/23 C |
| 4,326,094 | 4/1982 | Hunn | 174/23 C X |
| 4,703,998 | 11/1987 | Uchioke et al. | 350/96.23 |

FOREIGN PATENT DOCUMENTS

| | | | |
|---|---|---|---|
| 0207007 | 12/1983 | Japan | 350/96.23 |
| 0090315 | 5/1985 | Japan | 350/96.23 |

*Primary Examiner*—John D. Lee
*Attorney, Agent, or Firm*—Henry H. Gibson

[57] ABSTRACT

An electrical or fibre optic cable comprising one or more conducting filaments within a protective sheath are provided. The cable is characterized by having HEC powder between the filaments and the protective sheath. The HEC powder is of a type having an MS value between 0.7 and 1.25 and has not been treated with glyoxal.

6 Claims, 1 Drawing Sheet

CABLES WITH LOW MS HEC WATER-BLOCKING MATERIAL

The present invention relates to electrical or fibre optic cables of the type comprising one or more filaments, which conduct electricity or light, within a protective sheath. The present invention also relates to the manufacture of such cables.

Electrical or fibre optic cables generally comprise one or more filaments, which conduct electricity or light, within a protective sheath or covering. In such cables, it is preferable to fill the interstices between the sheath and the filaments with a filler comprising a powder such as standard grade hydroxyethyl cellulose, carboxymethyl cellulose, or a cross linked acrylamide polymer. Such powders, which swell when contacted with water, are included so that should water enter the cable e.g. by pores or fractures in the protective sheath, then the powder will swell and block the point of entry.

Each of the powders described above has a disadvantage. Thus, relative to the cellulose ethers, polyacrylamide is expensive. Carboxymethyl cellulose, although cheap and relatively stable, tends to be a less efficient block as it swells more than the others. Finally standard hydroxyethyl cellulose, whilst being cheap and efficient, tends to be unstable and to lose its blocking properties at elevated temperature.

A new grade of hydroxyethyl cellulose has been developed which is not only cheap and efficient but which is stabler than previously used grades.

Accordingly, the present invention provides an electrical or fibre optic cable comprising one or more conducting filaments within a protective sheath characterised in that between the protective sheath and the filaments there is provided a powder consisting essentially of a hydroethylcellulose having an MS value between 0.7 and 1.25 which has not been surface treated with glyoxal.

As regards the hydroxyethyl cellulose powder used, this is one having an MS (molar substitution) value of between 0.7 and 1.25 preferably between 0.8 and 1.1. The MS value of a hydroxyethyl cellulose is defined as the number of ethylene oxide molecules which have reacted with each anhydro-glucose unit in the cellulose.

The hydroxyethyl cellulose is also one which has not been surface treated with glyoxal.

The intrinsic viscosity of the cellulose raw material used to make the cellulose ether should be in the range 6 to 23 dl per gram preferably 15 to 20 dl per gram (as measured by following ASTM D-1795).

Where the cable is to contain substantial amounts of metals such as aluminium it is preferable to treat the hydroxyethyl cellulose after the ethoxylation reaction to remove residual corrosive salts, such as sodium acetate, which are present.

The hydroxyethyl cellulose powder of the present invention is preferably one in which greater the 90% by weight of the powder has a particle size of less than 175 microns.

The cables of the present invention can be prepared by one of a number of standard methods. In a preferred embodiment the cable is prepared by (1) stranding the filaments together to form a bundle (2) coating the bundle successively with a semiconductive layer, an insulator and a channeled semiconductive layer filling the channels of the channeled semiconductive layer with powdered HEC (4) applying an aluminium stripe and (5) finally covering with the protective sheath.

A cable produced by the process described above is shown in cross-section in FIG. 1. The cable comprises a bundle of conductive filaments (1) surrounded by an inner semiconductor (2) which is in turn surrounded by an outer, channeled semiconductor (3). The channels of (3) are filled with the HEC powder. Around the outer channeled semi conductor (3) is a strip of aluminium (4) and finally a protective sheath (5).

To illustrate the improvement which accrues from using the hydroxyethyl cellulose of the present invention reference is now made to the following experiments.

EXPERIMENTS 1–5

The performance of five samples was measured. Experiments 1 and 2 employed respectively a carboxymethyl cellulose and a hydroxyethyl cellulose of the type used previously, whilst Experiments 3 to 5 employed three examples of a hydroxyethyl cellulose according to the present invention. The blocking characteristics of each sample was measured before and after ageing for 60 days at 120° C. The results are summarised in the Table.

In the Table, the volumes h1, h2 and h3 relate to the volume occupied by the different states of the powder 24 hours after the powder had been contacted with water h1 = volume of residual powder
h2 = volume of powder which has gelled with water
h3 = volume of powder wetted with water

|  | EXPERIMENT | | | | |
| --- | --- | --- | --- | --- | --- |
|  | 1 | 2 | 3 | 4 | 5 |
| Composition | Carboxymethyl Cellulose | Hydroxyethyl Cellulose | Hydroxyethyl Cellulose | Hydroxyethyl Cellulose | Hydroxyethyl Cellulose |
| Intrinsic viscosity (dl/g) | 10 | 14 | 9 | 14 | 19 |
| MS value | 0.9 | 1.8 | 1.16 | 1.18 | 0.87 |
| Hydration time (minutes) | 0 | 0 | 0 | 0 | 0 |
| Corrosive salt present | NaCl | NaOAC | NaOAC | NaOAC | NaOAC |
| % salt by weight | 1 | 3.7 | 0.9 | 3.6 | 2.65 |
| Particle size distribution | | | | | |
| 175 μm | 100 | 100 | 100 | 100 | 100 |
| 125 μm | 99.3 | 98.0 | 46.0 | 40.9 | 49.1 |
| 75 μm | 44.9 | 70.1 | 36.4 | 35.6 | 33.2 |
| 45 μm | 6.4 | 25.0 | 15.5 | 9.7 | 12.3 |
| Before ageing | | | | | |

-continued

| | EXPERIMENT | | | | |
|---|---|---|---|---|---|
| | 1 | 2 | 3 | 4 | 5 |
| h1 (cm$^3$) | 9.0 | 5.0 | 5.0 | 5.5 | 5.5 |
| h2 (cm$^3$) | 4.5 | 5.0 | 5.0 | 5.5 | 4.5 |
| h3 (cm$^3$) | 2.0 | 2.0 | 2.0 | 1.5 | 1.0 |
| After ageing | | | | | |
| h1 (cm$^3$) | 14.5 | degraded | 5.0 | 10.0 | 3.0 |
| h2 (cm$^3$) | 12.5 | degraded | 5.0 | 6.0 | 3.0 |
| h3 (cm$^3$) | 30 | degraded | 5.0 | 1.0 | 1.0 |

I claim:

1. An electrical or fibre optic cable comprising one or more conductive filaments within a protective sheath and having a hydroxyethyl cellulose powder between the protective sheath and the filaments wherein the improvement comprises using hydroxyethyl cellulose which has a hydroxyethyl molar substitution, i.e. an MS value, of from about 0.7 to about 1.25 and has not been treated with glyoxal.

2. An electrical or fibre optic cable as claimed in claim 1 in which the hydroxyethyl cellulose has an MS value between 0.8 and 1.2.

3. An electrical or fibre optic cable as claimed in claim 1 in which the hydroxyethyl cellulose is one in which greater than 90% by weight of the powder has a particle size of less than 175 microns.

4. A process for producing an electrical or fibre optic cable which comprises assembling one or more conductive filaments within a protective sheath and having a hydroxyethyl cellulose powder between the protective sheath and the filaments wherein the improvement comprises using hydroxyethyl cellulose which has a hydroxyethyl molar substitution, i.e. an MS value, of from about 0.7 to about 1.25 and has not been treated with glyoxal.

5. The process of claim 4 wherein the hydroxyethyl cellulose has an MS value of from about 0.8 to about 1.2.

6. The process of claim 4 wherein greater than 90% by weight of the hydroxyethyl cellulose powder has a particle size of less than about 175 microns.

* * * * *